US009187369B2

(12) United States Patent
Gimenez et al.

(10) Patent No.: US 9,187,369 B2
(45) Date of Patent: Nov. 17, 2015

(54) PROCESS AND INSTALLATION FOR PRODUCTION OF CLINKER AND ELECTRICITY, AND PROCESS FOR MODIFICATION OF A PRODUCTION INSTALLATION OF CLINKER

(71) Applicant: LAFARGE, Paris (FR)

(72) Inventors: Michel Gimenez, Diemoz (FR); Franck Leroy, Saint Catherine les Arras (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 14/418,662

(22) PCT Filed: Jul. 17, 2013

(86) PCT No.: PCT/EP2013/065056
§ 371 (c)(1),
(2) Date: Jan. 30, 2015

(87) PCT Pub. No.: WO2014/019849
PCT Pub. Date: Feb. 6, 2014

(65) Prior Publication Data
US 2015/0203400 A1  Jul. 23, 2015

(30) Foreign Application Priority Data

Jul. 31, 2012  (FR) ..................... 12 57453

(51) Int. Cl.
*C04B 7/36* (2006.01)
*C04B 7/38* (2006.01)
*C04B 7/47* (2006.01)
*F27B 7/20* (2006.01)
*F27D 17/00* (2006.01)
*C04B 7/43* (2006.01)

(52) U.S. Cl.
CPC . *C04B 7/475* (2013.01); *C04B 7/38* (2013.01); *C04B 7/434* (2013.01); *F27B 7/2058* (2013.01); *F27D 17/004* (2013.01); *C04B 2290/20* (2013.01)

(58) Field of Classification Search
CPC .............. C04B 7/36; C04B 7/38; C04B 7/475
See application file for complete search history.

(56) References Cited

U.S. PATENT DOCUMENTS

| 5,216,884 A * | 6/1993 | Holsiepe ........................ 60/648 |
| 6,749,681 B1 * | 6/2004 | Burdis et al. .................. 106/744 |
| 8,997,489 B2 * | 4/2015 | Fuentes Samaniego et al. ............................. 60/645 |
| 2010/0180803 A1 * | 7/2010 | Hansen ........................ 106/771 |

FOREIGN PATENT DOCUMENTS

| CH | 689830 A5 * | 12/1999 |
| EP | 1 923 367 A1 | 5/2008 |
| FR | 2 505 473 A1 | 11/1982 |
| WO | WO 00/64832 | 11/2000 |
| WO | WO 2008/151877 A1 | 12/2008 |
| WO | WO 2009/147466 A1 | 12/2009 |
| WO | WO 2009/147513 A1 | 12/2009 |

OTHER PUBLICATIONS

English Translation of CH 689830 A5 (Zappa et al.) Dec. 15, 1999.*
International Preliminary Report on Patentability and the Written Opinion of the International Searching Authority issued in International Patent Application No. PCT/EP2013/065056, dated Dec. 6, 2013.
International Search Report issued in International Patent Application No. PCT/EP2013/066056, dated Dec. 6, 2013.

* cited by examiner

*Primary Examiner* — Paul Marcantoni
(74) *Attorney, Agent, or Firm* — Pillsbury Winthrop Shaw Pittman LLP

(57) ABSTRACT

A process and an installation for production of clinker and electricity, and a process for modifying a production installation of clinker are presented.

7 Claims, 3 Drawing Sheets

Figure 1:
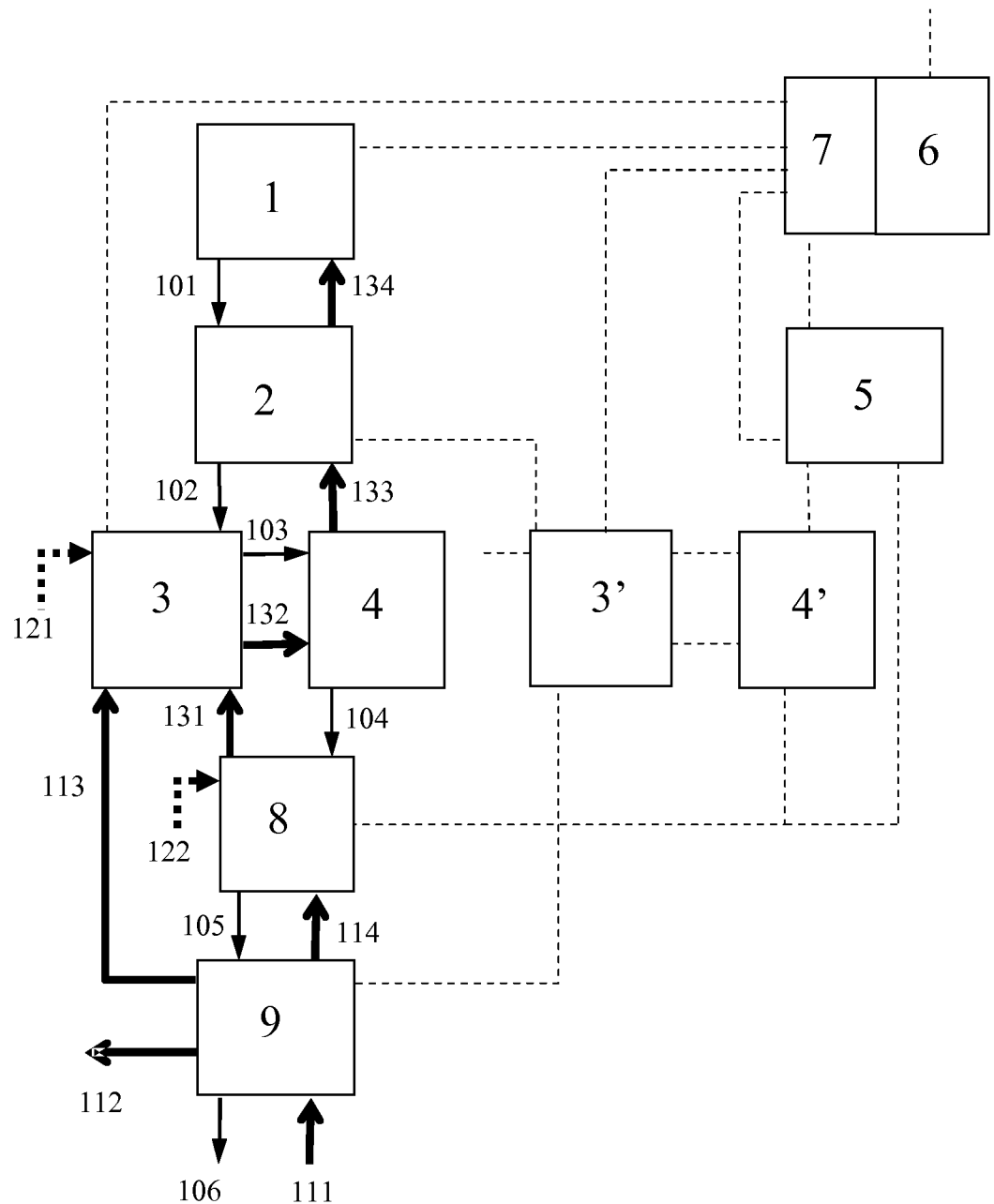

PROCESS AND INSTALLATION FOR PRODUCTION OF CLINKER AND ELECTRICITY, AND PROCESS FOR MODIFICATION OF A PRODUCTION INSTALLATION OF CLINKER

CROSS-REFERENCE TO RELATED APPLICATIONS

This is the U.S. National Stage of PCT/EP2013/065056, filed Jul. 17, 2013, which in turn claims priority to French Patent Application No. 1257453, filed Jul. 31, 2012, the entire contents of both applications are incorporated herein by reference in their entireties.

The present invention relates to a process and to an installation for production of clinker and electricity, as well as to a process for modification of a production installation of clinker.

Typically, a production installation of clinker first of all comprises a pre-heater, in which the raw meal is pre-heated. This pre-heated raw meal is then precalcined in a precalciner, in order to transform the $CaCO_3$ into $CaO$ and into $CO_2$. This transformation is generally not complete, since typically only approximately 90% is transformed The raw meal is typically precalcined at a temperature of 750 to 950° C. Lower temperatures are not suitable, because they do not provide sufficient reaction kinetics. Moreover, higher temperatures are not suitable either, because they provoke early and untimely clinkering of the raw meal.

The precalcined raw meal is then introduced into a kiln, where it is totally calcined in order to form the clinker. The latter is finally directed towards a cooler, where it is submitted to quenching. The precalciner and the kiln are fed by fuel, and by a combustion agent, in particular composed of air which was reheated in the cooler.

After cooling, the clinker is transformed into cement, in particular by grinding and the addition of additives. The production of clinker and its transformation into cement may be carried out on the same industrial site, called a cement plant. By way of a variant, the production of clinker may be carried out in a first industrial site, hence called a clinkering plant, and the transformation of the clinker into cement may be carried out in a distant industrial site.

The production of clinker generates substantial quantities of $CO_2$, which is produced in two main manners. On the one hand, decarbonation of the raw meal, as described herein above, creates an emission of $CO_2$ formed by the decomposition of the $CaCO_3$. On another hand, the combustion of fuels containing carbon induces emissions of $CO_2$. The global quantity of generated $CO_2$ has to be controlled as much as possible for environmental reasons.

The global production of cement implies a very high consumption of electricity, typically within the order of 150 electrical kWh per ton of clinker. This electric energy is first of all required for the production of the clinker, in particular to prepare the raw meal, to preheat the different pieces of equipment, to transport the different flue gases, using very big fans, as well for to the final processing of the clinker. Furthermore, this energy is necessary for the transformation of the clinker into cement, in particular, the grinding operation, the addition of additives, the storage and loading, in bulk or in bags, of the cement ready to be sold. The production of clinker, consumes approximately 50% of this total energy, which is to say approximately 75 electrical kWh per ton of clinker. The electrical kWh are the kwh available in the form of electricity produced from thermal kWh, i.e. depending on the yield of the conversion, an electricity generator can produce y electrical kWh starting from x thermal kWh provided by hot gases, y being less than x, and the y/x ratio being called "the efficiency conversion factor" of the power generator.

The production of clinker and of electricity, on a same industrial site, presents advantages. It makes it possible, in particular to continue to produce clinker, even if electricity is no longer available from the usual supply network. This can occur occasionally, during momentary downtimes, but also more durably, in particular on sites where the supply of electricity is not always reliable, or when the cement plant is not connected to a local electric supply network.

This production of on-site electricity can, first of all, be provided using a means of producing electricity, for example a power generator, which is not integrated in the production installation of clinker but is located near the latter. This solution is however, not satisfactory, because it implies high cost premiums. Moreover, when electricity is easily available, this unit is then seldom useful.

Heat is also known to be recovered from some of the process's flue gases. The hot gases leaving the pre-heater and/or the excess air coming from the cooler are directed towards recovery installations of lost heat. These effluents transmit their heat to produce steam, which makes it possible to generate electricity using a steam turbine.

This second solution is not totally satisfactory either. The temperature and pressure of the produced superheated steam is not very high. The conversion efficiency of the heat into electricity is low, in the order of 20%. Only a low fraction of the electric energy required for the entire process can be produced, typically from 20 to 30%.

The precalciner and/or the kiln are also known to be fed with a much greater quantity of fuel than theoretically required. Part of the hot flue gases are then directed directly towards the generator of steam. The temperature and pressure of the superheated steam are much greater than those supplied by the recovery solution of lost heat, described herein above. The conversion efficiency of the heat into electricity can increase to approximately 35%. The electricity produced can therefore cover all the requirements related to the production of the cement.

This third solution is however, expensive. It is indeed necessary to over-dimension certain pieces of equipment, in particular the precalciner, so that it can be fed with the required quantities of fuel and air. Furthermore, this solution is not flexible. Therefore, when electricity is easily available, the over-dimensioned precalciner requires an additional gas flow to operate correctly, which generates a cost premium in terms of heat and energy consumption.

A fourth solution could be to use a part of the raw meal to recover energy and produce electricity via a steam turbine connected to at least one supplementary precalciner in a line which is positioned in parallel to the conventional line to produce clinker. However, in order to modify the quantity of electricity produced, it would be necessary to modify the respective quantity of raw meal in each precalciner. The latter has the disadvantage that the pre-heater would not receive enough raw meal and gas flow volume for its optimal operation mode, which means decreasing the efficacy of the said pre-heater.

In these conditions, the present invention aims at resolving the above inconveniences. It aims at proposing a process, which first of all makes it possible to provide electricity, in a reliable manner, without any loss of efficacy in the production of clinker, for a production installation of clinker.

It also aims at proposing such a process, which makes it possible to vary the quantity of electricity produced in a simple and rapid manner.

With this aim the invention relates to a process for production of clinker and electricity, comprising the following steps:
- introduce the raw meal, fuel and a combustion agent, in at least two precalciners positioned in parallel,
- precalcine the raw meal at a temperature of from 750 to 950° C., in order to obtain precalcination flue gases and a precalcined raw meal,
- treat the precalcination flue gases and the precalcined raw meal towards respective cyclones, in order to obtain precalcination flue gases and a precalcined raw meal,
- clinkerise the precalcined raw meal, in order to obtain clinker,
- produce steam, by transmission of heat from at least one part of the flue gases coming from at least one secondary precalciner and the corresponding cyclone,
- produce electricity from this steam, using an electricity generator comprising a steam turbine and steam generator,
- vary the feed rate of raw meal and/or the flow rate of fuel and/or the flow rate of combustion agent in at least one secondary precalciner, to vary the quantity of electricity produced,
- introduce into at least one secondary precalciner, a flow of a dilution flue gas, this flow being, in particular, formed from one part of the precalcination flue gases having already transmitted their heat,
- wherein the precalcination flue gases coming from the at least one secondary precalciner (3') and the corresponding cyclone (4'), are diluted, before transmitting their heat, to obtain diluted precalcination flue gases, in particular with a fraction of these precalcination flue gases having already transmitted their heat.

Typically, the raw meal is generally a mix, comprising, for example limestone and clay. Upstream of the process of the invention, this raw meal is prepared in view of being clinkerised, then it is collected in an feeding means. The raw meal then goes through a pre-heating step. The different steps described herein above are carried out in a typical manner.

According to the invention, at least two precalciners are positioned in parallel downstream of the feeding means of raw meal. By analogy with electricity, the feeds of raw meal going through the precalciners are assimilated to branches of a circuit whilst the upstream feeding means and the downstream kiln are the nodes of this circuit. In other words, a given fraction of raw meal is directed, from the upstream feed towards a unique precalciner. Downstream from this precalciner, this fraction is then directed towards the kiln or it is sent back towards the precalciner, but it is not introduced in the other precalciner.

The precalcination of the raw meal is carried out, in each precalciner, in a typical manner. Thus, the temperature is from 750 to 950° C., and the residence time is within the order of a few seconds, typically from 5 to 15 seconds. The precalcined raw meal is then introduced into the kiln, where it is clinkerised in a typical manner.

Moreover, at least one part of the superheated flue gases, evacuated from at least one secondary precalciner, is directed towards a heat exchanger. These effluents make it possible to produce steam, by transmitting all or part of their heat, typically at the water dew point. The superheated steam thus produced makes it possible to feed a steam turbine, which ensures the production of electricity, in particular, by means of an alternator. The production phase of electricity, using superheated steam, is carried out in a typical manner.

The quantity of electricity produced depends, among other, on the gas parameters, which transmit all or part of their heat. These parameters are, in particular, the temperature, the pressure and the flow rate. It is possible to vary these parameters by modifying the feed rates of raw meal and/or flow rates of combustion agent and/or of fuel, for each precalciner from which the flue gases transmit their heat.

For a given quantity of processed raw meal, the higher the flow rates of combustion agent and fuel, the greater the quantity of electricity produced. This result can also be reached by reducing the feed rate of raw meal, for given flow rates of combustion agent and of fuel.

In contrast, for a given quantity of processed raw meal, the lower the flow rates of combustion agent and fuel, the lower the quantity of electricity produced. This result can also be reached by increasing the feed rate of the raw meal, for given flow rates of combustion agent and of fuel.

The quantity of electricity produced may be modified by varying other parameters, for example:
- the number of secondary precalciners whose effluents transmit their heat. The quantity of electricity increases with this number, without variations of the other parameters;
- the fraction of flue gases which transmit their heat, for a given precalciner. The higher this fraction, the greater the quantity of electricity.

As already described herein above, the process of the invention is particularly flexible. It can be adapted to different situations, according to whether the energy demand is high or not, and/or to whether electricity is easily available.

In a first situation, there is no need to provide electricity. In this case, one single precalciner is used and its flue gases do not transmit their heat in view of producing steam.

In another situation, the quantity of electricity produced is at least equal to all the energy required for the global production of cement, that is, within the order of 150 electrical kWh per ton of clinker. This quantity of electricity may even feed the entire industrial site, it may even be used for other purposes and optionally it may be re-sold. In this case, the various parameters listed above are modified, in order to generate this quantity of electricity.

Moreover, the invention makes it possible to easily generate a quantity of electricity at least equal to the energy required to produce clinker alone, that is, at least equal to 75 electrical kWh per ton of clinker.

Furthermore, the invention makes it possible to easily produce any quantity of electricity, comprised between the ranges of values described herein above, preferably from 0 to 150 electrical kWh per ton of clinker, more preferably from 75 to 150 electrical kWh per ton of clinker. For this purpose, the person skilled in the art may modify all or some of the parameters listed above. It may be possible to produce less than 75 electrical kWh, for example by using more than two secondary precalciners, but this would be less interesting in view of saving energy.

Moreover, it is advantageous to use at least two precalciners. This makes it possible to avoid over-dimensioning each of these precalciners. Furthermore, each precalciner can be used in a specific manner, for example differently to the other precalciner or precalciner(s). In particular, different fuels may be used from one precalciner to the other.

Moreover, the invention makes it possible to modify an existing production installation of clinker. This modification is not very complex since it consists of installing each secondary precalciner, as well as its connections to existing pieces of equipment and to the steam generator. By way of a variant, all the components of the installation according to the invention may be installed at the same time.

The dilution flue gas allows controlling the rate of decarbonation of the raw meal and the decarbonation temperature while preserving the heat to be used for the production of electricity. Indeed, thanks to the use of a dilution flue gas, the temperature decreases while the volume increases, and so the heat is kept.

Moreover, when the installation is in the energy production mode, the quantities of combustion agent and fuel are greater than those sufficing to precalcine the raw meal. Consequently there is a risk that the temperature inside the precalcination enclosure could be higher than the suitable range of temperature for this step. The supply of a diluted flue gas makes it possible to control this temperature, so that the precalcination step is carried out optimally. It is most particularly advantageous to use for this purpose the cooled flue gas, which has already released its heat. This makes it possible to ensure an additional function to this last flow, which otherwise would be released into the atmosphere.

The dilution of the precalcination flue gases coming from the cyclone connected to at least one secondary precalciner, before transmitting their heat, in particular with a fraction of these precalcination flue gases having already transmitted their heat, makes it possible, for example, to confer to these gases a temperature of 600 to 800° C., as described herein after. Moreover, this dilution allows controlling the temperature of the gases at the inlet of the electricity generator.

Preferably, the implementation process of the installation according to the invention may alternate between, on the one hand, phases where there is an absence of production of electricity, during which phases the raw meal is introduced in a unique precalciner, called the main precalciner and, on the other hand, production phases of electricity during which part of the raw meal is introduced in the main precalciner and another part in at least one other precalciner, called secondary precalciner.

This presents specific advantages. During phases when the usual supply network does not produce electricity, the installation is run using the main precalciner only, typically it operates at its nominal capacity. The, or each secondary precalciner therefore does not operate during the entire process.

Then, if the installation of the invention has to produce electricity, the upstream feed of raw meal is divided which is to say that it is distributed between the precalciners. The different feeds of raw meal, as well as the flows of combustion agent and fuel in each precalciner, are then adapted according to the desired quantity of electricity. A gas dilution loop is used to keep the gas-flow volume constant into the preheater after reducing the fuel feeding consequently to the raw meal splitting.

Preferably, the raw meal is introduced for a first part into a main precalciner, and for another part, into at least one secondary precalciner, and only the precalcination flue gases, coming from the, or from each secondary precalciner transmit their heat, after their dilution, to produce steam. This makes it possible to easily control the quantity of electricity supplied, by varying the flow rates of combustion agent and fuels associated to the secondary precalciner, or to each secondary precalciner.

Preferably, the precalcined raw meal is clinkerised in a kiln and the flue gases of the kiln are directed only towards the main precalciner, and only the flue gases of the main precalciner and the corresponding cyclone are directed towards a pre-heater, located between a feeding means of raw meal and this main precalciner. This makes it possible to more easily pilot the entire process. The main precalciner, which is used in a typical manner, is disassociated from each secondary precalciner, the secondary precalciner(s) being dedicated to the production of electricity.

Preferably, precalcination flue gases coming from the at least one secondary precalciner and the corresponding cyclone are diluted in an additional cyclone, in order to obtain precalcination flue gases and precalcined raw meal. The additional cyclone has the advantage to homogenise the temperature of the diluted precalcination flue gases and to dedust such gases. The steam generator is thus protected from dust and keeps its efficacy.

Preferably, an alternative fuel is introduced into at least one precalciner. Such fuel is, for example, biomass, or such waste materials as used tyres or residue resulting from the crushing of automobiles. This makes it possible to upgrade this fuel, and globally reduce the production cost of electricity.

The use of at least two precalciners, combined with the use of alternative fuels is most particularly advantageous. Each precalciner, as described above, may be fed with a specific fuel. One precalciner may therefore be, for example, fed with typical fossil fuel, whilst the other is fed with waste materials, or the precalciners may be fed with different types of waste materials, in particular liquid and solid waste materials.

Preferably, the diluted precalcination flue gases transmit their heat at a temperature of 600 to 800° C. This range of temperatures, which is that of these flue gases at the inlet of the heat exchanger, makes it possible to obtain superheated steam at satisfactory pressures and temperatures. Furthermore, it makes it possible to use heat exchangers which are easily available on the market.

Preferably, only two precalciners are used. This makes it possible to ensure satisfactory piloting of the entire process, in particular in terms of the equilibrium of the pressure drops.

Preferably, the process further comprises the following steps:
 cool the clinker in a cooler,
 introduce gas, for example air, into this cooler,
 direct the cooler's effluent gas, as combustion agents, towards each precalciner,
 exhaust gas from this cooler.

The exhaust of gas corresponds to the gas introduced into the cooler minus the cooler's effluent gases directed towards each precalciner and the kiln, as combustion agents.

Preferably, a combustion agent enriched with oxygen, even constituted with substantially pure oxygen, is introduced into at least one precalciner. This makes it possible to use substantial quantities of waste materials which are difficult to burn, and/or concentrate the $CO_2$ in the flue gases. The use of such a combustion agent is described, for example, in the EP-A-1 923 367 patent application.

The invention also relates to an installation for production of clinker and electricity, comprising:
 a feeding means of raw meal,
 a clinkering kiln of the precalcined raw meal,
 at least two precalciners positioned in parallel between the feeding means of raw meal and the kiln, adapted to precalcine the raw meal at a temperature of 750 to 950° C., each precalciner having:
  respective inlets for the raw meal, the fuel and the combustion agent,
  an outlet for the precalcined raw meal,
  an outlet for the precalcination flue gases, connected to evacuation means of these flue gases,
 at least two cyclones respectively connected to the outlets of the precalciners,
 optionally at least one additional cyclone connected to the outlet of gases of the cyclone connected to the at least one secondary precalciner,
 a generator of electric power comprising a steam turbine and means for the production of steam, which are connected to evacuation means of the flue gases of the cyclone connected to the at least one secondary precalciner, or which are optionally connected to evacuation means of the flue gases of the additional cyclone, the means comprising:

optionally an outlet of a flue gas connected to an inlet of the main precalciner or of the corresponding cyclone, optionally an outlet of flue gas connected to an inlet of the feeding means, at least one outlet of a dilution flue gas connected to an inlet of at least one secondary precalciner or to an inlet of at least one corresponding cyclone, and at least one outlet of a fraction of a precalcination flue gas having already transmitted their heat connected to an outlet of the precalcination flue gases of the cyclone connected to the at least one secondary precalciner or optionally to an inlet of at least one additional cyclone.

Preferably, at least one precalciner of the installation according to the present invention is a Hot Spot precalciner.

Finally, the invention relates to a process for modification of a production installation of clinker, the installation to be modified comprising:

a feeding means of raw meal, a precalciner adapted to precalcine raw meal at a temperature of 750 to 950° C., this precalciner having an inlet of raw meal connected to the feeding means of raw meal, an inlet of fuel and of a combustion agent, an outlet of the precalcined raw meal, and an outlet of the precalcination flue gases, a clinkering kiln of the precalcined raw meal, connected to the outlet of the precalcined raw meal of a cyclone which is connected to the outlet of the precalcined raw meal of the main precalciner, this process for modification comprising the following steps:

install at least one other precalciner, called secondary precalciner, having respective inlets for the raw meal, the fuel and the combustion agent, an outlet of the precalcined raw meal, and an outlet of the precalcination flue gases, connect to the feeding means of the raw meal, the inlet of the raw meal of the secondary precalciner or of each secondary precalciner, connect to a cyclone the outlet of the precalcined raw meal and the outlet of the precalcination flue gases of the secondary precalciner or of each secondary precalciner, connect to the kiln, the outlet of the precalcined raw meal of the cyclone or of each cyclone connected to the at least one secondary precalciner, and optionally of the additional cyclone, connect the outlet of the precalcination flue gases of the cyclone connected to at least one secondary precalciner, or optionally of the additional cyclone, to production means of steam, which are part of a generator of electric power, connect an outlet of a dilution flue gas to an inlet of at least one secondary precalciner or to an inlet of at least one corresponding cyclone, connect an outlet of a fraction of a precalcination gas having already transmitted their heat to an outlet of the precalcination gases of the cyclone connected to at least one secondary precalciner or optionally to an inlet of at least one additional cyclone.

Figure 2:
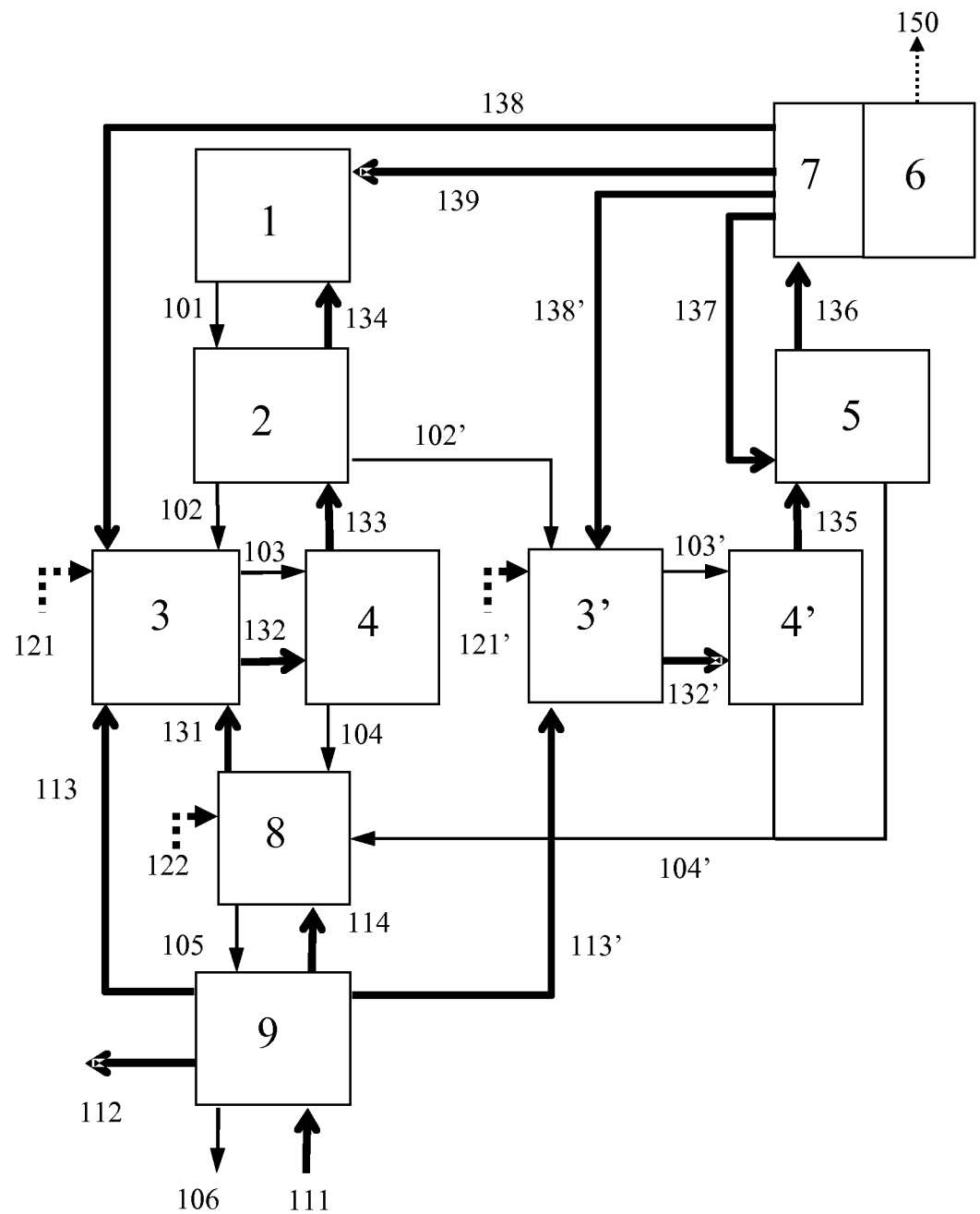
Figure 3:
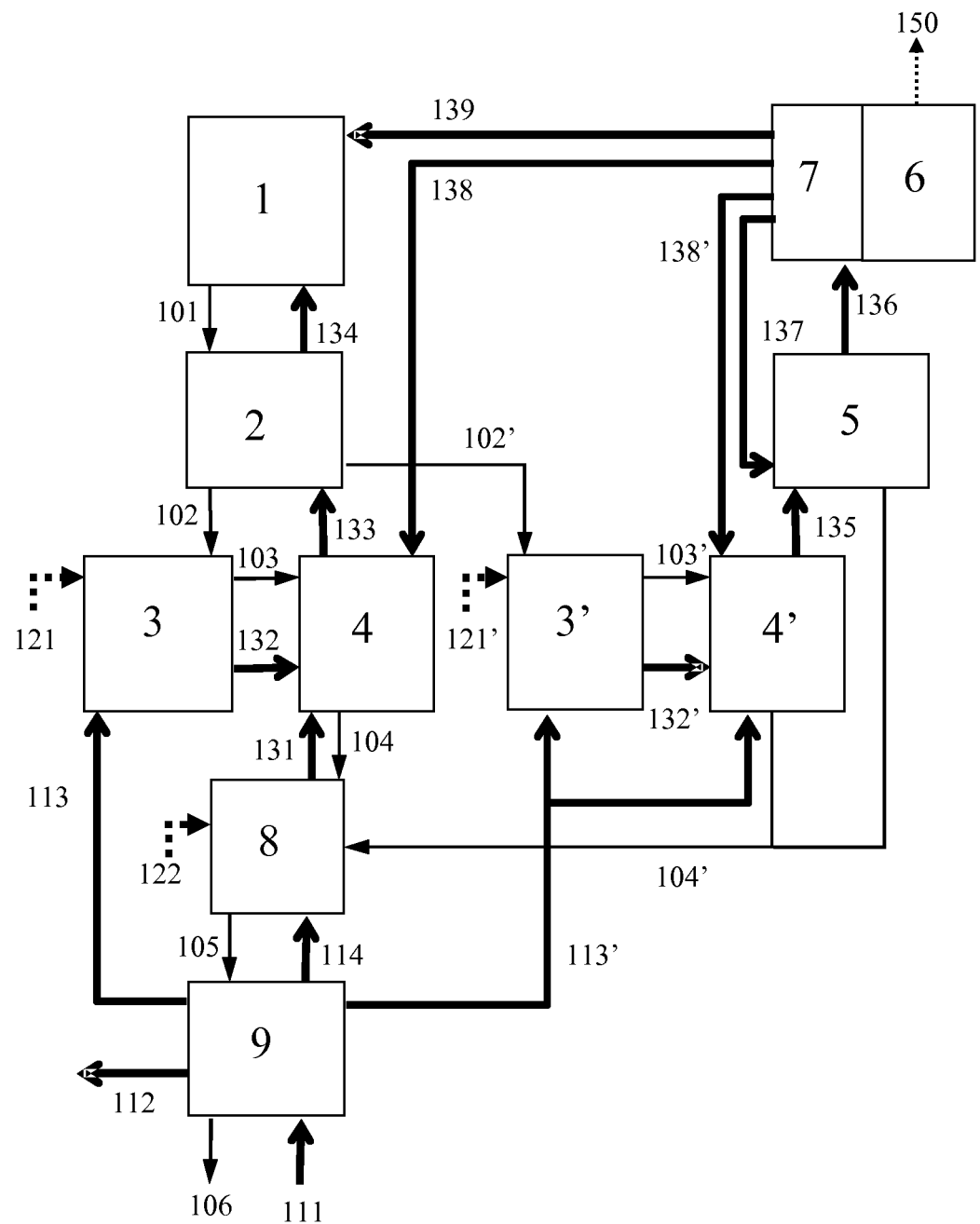

The invention is described below in reference to the annexed diagrams, provided purely for illustrative and non-limiting purposes, wherein:

FIG. 1 represents, in the form of a block diagram, an example of an embodiment of an installation according to the invention in a configuration where it does not produce electricity;

FIG. 2 represents, in the form of a block diagram, the installation of FIG. 1 in a configuration where it produces electricity; and FIG. 3 represents, in the form of a block diagram, an example of another embodiment of an installation according to the invention in a configuration where it produces electricity and where the precalciners are Hot Spot precalciners; Hot Spot precalciners are known precalciners which have a specific temperature control when in use, for example to enable calcination of low grade fuels.

In FIGS. 1 to 3, the various pieces of equipment of the installation are represented by blocks. These blocks are connected by lines, with or without arrows, illustrating the various possible flows. A dotted line without an arrow means there is no flow between the given blocks. A bold dotted line with an arrow, means that a flow of fuel exists between the given blocks, the direction of the arrow materialising the direction of the flow. A bold line with an arrow means that a flow of gas exists between the given blocks, the direction of the arrow materializing the direction of the flow. A thin dotted line with an arrow means that a flow of electricity exists, the direction of the arrow materializing the direction of the flow. Finally, a thin line with an arrow means that a flow of raw meal exists between the given blocks, the direction of the arrow materialising the direction of the flow.

The installation according to the invention comprises:

a feeding means 1 of raw meal; it may be of any type known per se for the supply of a raw meal prepared for the clinkering process;

a pre-heater 2 comprising in particular one or more cyclones;

two precalciners 3 and 3', of a typical type, each one comprising in particular respective inlets of raw meal, of fuel and of combustion agent, typically air, and respective outlets of the precalcined raw meal and flue gases;

the mixing box and the cyclone associated to the main precalciner 3, represented by a single block 4, as well as the mixing box and the cyclone associated to the secondary precalciner 3', represented by a single block 4'. These different pieces of equipment also have a typical structure;

an additional cyclone 5, of a known type, is connected to the cyclone 4' of the secondary precalciner 3';

a generator of electric power 6, also of typical structure. It comprises in particular a steam turbine, an alternator and a steam generator 7, the steam generator feeding this turbine. This generator of steam comprises in particular a heat exchanger through which a water-pipe line passes; and a clinkering kiln 8 and a cooler 9, both of typical type.

In the configuration illustrated in FIG. 1, the installation of the invention uses electricity from the usual supply network, but does not produce electricity. The raw meal proceeding from the feeding means 1, is introduced, into the pre-heater 2 via flow 101. The pre-heated raw meal is then introduced into the main precalciner 3, via flow 102, where it is precalcined at a temperature of typically 750 to 950° C. The precalcined raw meal is then introduced, via flow 103, into a mixing box and the cyclone 4 then, via flow 104, into the kiln 8 where it is clinkerised. The clinkerised raw meal, or clinker, is sent towards the cooler 9 via flow 105, where it is cooled. Finally, the clinker is evacuated via flow 106, in the direction of non-represented additional equipment in view of its being transformed into cement.

Simultaneously, ambient air is introduced into the cooler 9, via flow 111. A first fraction of this pre-heated air is evacuated, via flow 112. This flow 112 constitutes a purge, the flow rate of which may be varied according to the different configurations of the installation, in particular, in order to compensate the variations of the flow rate of air sent to the precalciners.

Two additional fractions of this pre-heated air are directed towards the main precalciner 3 and the kiln 8, via respective flows 113 and 114. Flow 113 is used as a combustion agent, associated to fuel introduced via flow 121, in view of the precalcination step. Moreover, flow 114 is used as a combustion agent, associated to the fuel introduced via flow 122, in view of the clinkering step.

A dust-laden gas is extracted from the kiln 8 in direction of the main precalciner 3, via flow 131. This gas is then directed towards the mixing box and the cyclone 4, via flow 132, then towards the pre-heater 2 via flow 133, and finally towards the feeding means 1 via flow 134.

Typically, the different flue gases have temperatures within the following ranges:
purge 112 of the cooler: from 150 to 300° C.,
combustion agent 113 for the main precalciner: from 850 to 1000° C.,
combustion agent 114 for the kiln: from 900 to 1000° C.,
effluent 131 from the kiln: from 1000 to 1100° C.,
effluent 132 from the main precalciner: from 750 to 950° C.,
effluent 133 from the cyclone: from 750 to 950° C.,
effluent 134 from the pre-heater: from 300 to 400° C.

All the operations described herein above are implemented in a typical manner. In this configuration of consumption of electricity, the installation does not use the secondary precalciner 3', or its associated mixing box and cyclones. No flow is directed towards the steam generator 7, hence the electricity generator 6 is not in operation. In other words, in this configuration, the installation of the invention operates as a typical installation which does not produce electricity.

In another configuration, illustrated in FIG. 2, the installation of the invention produces electricity. This situation occurs in particular, when the local supply network is completely out of service, momentarily or for a prolonged period of time. The quantity produced thus corresponds to the quantity required to operate the entire production process of cement, which is typically 150 electrical KWh per ton of clinker.

In FIG. 2, the flows already present in FIG. 1 have the same reference numbers. The pre-heated raw meal is divided downstream of the pre-heater, which is to say that a first fraction is directed towards the main precalciner 3 via flow 102, whilst a second fraction is directed towards the secondary precalciner 3' via flow 102'. This second fraction is only used to depollute combustion gases and not for thermal exchanges. Fuel is introduced in the secondary precalciner 3' via flow 121' for the precalcination step, and an additional fraction of cooled air is directed towards this secondary precalciner 3' from the cooler 9, via flow 113'.

A flow 132' of dust-laden gas, constituting the precalcination flue gases and a flow 103' of precalcined raw meal is directed towards the mixing box and the cyclone 4', from the secondary precalciner 3'. This cyclone 4' directs, on the one hand, a flow of precalcined raw meal towards the kiln 8 and, on the other hand, a flow 135 of dust-laden gas towards the additional cyclone 5. Finally, this final cyclone directs, on the one hand a flow of precalcined raw meal towards the kiln and, on the other hand a flow 136 of not very dust-laden gas towards the steam generator 7. These two flows of precalcined raw meal, sent by the cyclones 4' and 5, are reunited in a common flow 104' directed towards the kiln.

The flow 136 corresponds to that of the precalcination flue gases 132', after dust is removed from these gases. The flow 136 is therefore less loaded in dust, which is advantageous to ensure good operations of the exchanger, which is part of the generator 7. Moreover, the passage of these flue gases 132' in the two cyclones 4' and 5 does not provoke any significant loss of heat in these gases from the outlet of the secondary precalciner 3' to the outlet of the additional cyclone 5.

In the steam generator 7, the flow 136 and water circulate in a known manner in an exchanger. The flow 136 transmits all or part of its heat to the water, in order to produce superheated steam. The latter makes it then possible, in a known manner, to produce electricity in the generator 6, which is materialised by flow 150. Furthermore, the low dust-laden gas, having transmitted its heat, is directed back towards the installation via four flows:
a flow 137 towards the additional cyclone 5. This makes it possible to dilute the flow 135, upstream of this cyclone. Thus, the downstream flow 136 is cooled and its temperature is adapted, to ensure efficient transmission of heat, whilst remaining compatible with standard equipment for heat exchanges;
two flows 138 and 138' towards respective precalciners 3 and 3'. This makes it possible to control the temperature inside each of the precalciners, in order to ensure optimum precalcination; and
a last flow 139 towards a feeding means 1 of raw meal, to contribute to drying the raw meal, the fuel and/or other additions to the cement.

In the configuration, as shown in FIG. 2, for a production of electricity which corresponds to the quantity required to operate the entire production process of cement, the temperature of the flue gases, described with reference to FIG. 1, is substantially the same as above. Moreover, the other flue gases typically have temperatures in the following ranges:
flow 113': from 300 to 1000° C. The hottest fraction of this flow is used for combustion in the secondary precalciner 3', and the coolest fraction is used for the dilution, in addition as a complement to flow 138',
effluent 132' of the secondary precalciner: from 750 to 950° C.,
effluent 135 of the cyclone: from 750 to 950° C.,
effluent 136 of the additional cyclone: from 600 to 800° C.,
effluents 137, 138, 138' and 139: from 200 to 300° C.

The flow rates of flue gases 111, 114, 131, 133 and 134, as well as the feed rates of material 101, 105 and 106, are substantially unchanged relative to the configuration in FIG. 1. In contrast, the raw meal 102 and 102' are divided between the two precalciners 3 and 3', at substantially equal feed rates. However, different feed rates of raw meal may be introduced in the respective precalciners.

The flow rate of combustion agent 113 and the flow rate of fuel 121 in the main precalciner 3 are reduced compared to the configuration in FIG. 1. In contrast, the flow rate of combustion agent 113' and the flow rate of fuel 121' in the secondary precalciner 3' are high. In order to compensate the global increase of the flow rate of combustion agent (113+113'), the flow rate of the off gas 112 is considerably reduced.

A lot of air is introduced in the secondary precalciner 3', in order to generate the heat required to produce electricity. In order to control the temperature in this secondary precalciner 3', the dilution flow 138' also has a high flow rate. Moreover, because the downstream flow 136 of the additional cyclone 5 has a high flow rate, this flow 136 is diluted using a recycled flow 137 which also has a high flow rate.

FIG. 2 illustrates the notion of positioning the two precalciners 3 and 3' in parallel between the feeding means 1 and the kiln 8, by analogy with electric circuits. This feeding means and this kiln constitute the nodes of a circuit, whilst the branches of this circuit are formed, on the one hand by flows 102, 103 and 104 and, on the other hand, by flows 102', 103' and 104'. The two precalciners may be assimilated to resistances and to inductances.

In these production conditions, the flue gases 131 coming out of the kiln 8 are only directed towards the main precalciner 3. Furthermore, the pre-heater 2 only receives the flue gases 133 coming from this main precalciner 3. This makes it possible to maintain independence between the piloting of the typical process, as described in FIG. 1, and the piloting of the production of electricity.

FIG. 3 illustrates a configuration, wherein precalciners of the Hot Spot type are used as precalciners 3 and 3'. All the boxes and the flows are the same as those described with reference to FIGS. 1 and 2, except flows 131, 113', 138 and 138'. Indeed, in view of adapting the flows to the specific functioning of Hot Spot precalciners, flows 138 and 138' are directed back from the steam generator 7 towards respective mixing boxes and cyclones 4 and 4'. This makes it possible to control the temperature at the end of the precalcination steps and thus to control the raw meal decarbonation rate.

The outlet of gases 131 coming from the kiln 8 are no more directed to the main precalciner 3 but to the cyclone 4. The outlet of gases 113' from the cooler 9 is directed to the secondary precalciner 3' and to the cyclone 4'. The objective is to direct as less gas as possible in the precalciners so that they rapidly heat, and there is more dilution in the cyclones 4 and 4'.

In order to modify the quantity of electricity produced, and notably to pass from the production of electricity which corresponds to the quantity required to operate the entire production process of cement to the production of a lower quantity of electricity, the flow rates of combustion agent 113' and fuel 121', towards the secondary precalciner 3', are reduced. Given that the flow rate of combustion agent 113 in the main precalciner 3 remains substantially unchanged, the flow rate of the gas purge 112 is increased, whilst still remaining less than in the configuration in FIG. 1.

Less air is introduced in the secondary precalciner 3', so that the flow rates of the different downstream flue gases 132', 135, 136 as well as the dilution flow 138' are reduced. Furthermore, because the flow rate of the downstream flow 136 of the additional cyclone is reduced, the flow rate value of the recycled flow 137 is also reduced. Finally, the feed rate of flow 139 towards the feeding means 1 is also lower than in conditions for a production of electricity which corresponds to the quantity required to operate the entire production process of cement.

In order to modify the quantity of electricity produced, and notably to pass from the production of electricity which corresponds to the quantity required to operate the entire production process of cement to the production of a lower quantity of electricity, the person skilled in the art may vary other parameters than those specified in the present description. Furthermore, the person skilled in the art can vary the appropriate parameters in order to produce any quantity of electricity, between the quantity of electricity which corresponds to the quantity required to operate the entire production process of cement and lower quantities of electricity, described herein above.

The installation of the invention can also produce a greater quantity of electricity, even much greater than that of the configuration in FIG. 2. The surplus of generated electricity then makes it possible to supply the entire industrial site, even residential areas located near the installation. This surplus can also be used otherwise, or it may be sold. In order to produce this surplus electricity, the person skilled in the art can vary the appropriate parameters.

EXAMPLE

The following example, provided purely for illustrative and non-limiting purposes, illustrates a particular embodiment of the invention. The tables below give the flow rates for each flow described herein above, and the temperature of the flue gases, for three different configurations: C1: producing no electricity;

C2: producing a quantity of electricity which corresponds to the quantity required to operate the entire production process of cement, i.e. around 150 electrical kWh per ton of clinker; and C3: producing a quantity of electricity which corresponds to the quantity required to operate only the production process of clinker, i.e. around 75 electrical kWh per ton of clinker.

The references given are those of FIGS. 1, 2 and 3.

| Gas flow rates in $Nm^3$ per kilogram of clinker produced | | | | |
|---|---|---|---|---|
| FLOW | C1 | C2 | C3 | TEMPERATURE (° C.) |
| 111 | 2.00 | 2.00 | 2.00 | ambient |
| 112 | 1.11 | 0.05 | 0.60 | from 150 to 300 |
| 113 | 0.52 | 0.36 | 0.36 | from 900 to 950 |
| 113' | 0.00 | 1.22 | 0.67 | from 300 to 950 |
| 114 | 0.37 | 0.37 | 0.37 | 957 |
| 131 | 0.48 | 0.48 | 0.48 | 1050 |
| 132 | 1.32 | 1.32 | 1.32 | 865 |
| 132' | 0.00 | 1.63 | 0.84 | 865 |
| 133 | 1.32 | 1.32 | 1.32 | 865 |
| 134 | 1.41 | 1.41 | 1.41 | 320 |
| 135 | 0.00 | 1.65 | 0.84 | 865 |
| 136 | 0.00 | 2.54 | 1.31 | 650 |
| 137 | 0.00 | 0.89 | 0.47 | 250 |
| 138 | 0.00 | 0.26 | 0.26 | 250 |
| 138' | 0.00 | 0.23 | 0.00 | 250 |
| 139 | 0.00 | 1.16 | 0.58 | 250 |

| Material feed rates in kilograms per kilogram of clinker produced | | | |
|---|---|---|---|
| FLOW | C1 | C2 | C3 |
| 101 | 1.64 | 1.64 | 1.64 |
| 102 | 1.75 | 0.88 | 0.88 |
| 103 | 1.07 | 0.53 | 0.53 |
| 104 | 1.07 | 0.53 | 0.53 |
| 102' | 0.00 | 0.88 | 0.88 |
| 103' | 0.00 | 0.53 | 0.53 |
| 104' | 0.00 | 0.53 | 0.53 |
| 105 | 1.00 | 1.00 | 1.00 |
| 106 | 1.00 | 1.00 | 1.00 |

| Fuel flow rates in kilocalories per kilogram of clinker produced | | | |
|---|---|---|---|
| FLOW | C1 | C2 | C3 |
| 122 | 338 | 338 | 338 |
| 121 | 413 | 283 | 283 |
| 121' | 0 | 495 | 314 |
| TOTAL | 750 | 1115 | 934 |

Configuration C2 makes it possible to generate 137 electrical KWh of electric power, per ton of clinker. This makes it possible to supply the power required to run the entire production process of cement. The installation of the invention, in this configuration, is therefore a <self-sufficient> type.

Moreover, Configuration C3 makes it possible to generate 69 electrical KWh of electric power, per ton of clinker, which is to say substantially half the power of Configuration C2. Typically, this intermediary power supply makes it possible to run the production process of clinker alone.

It is to be noted that the gas flow volume of the installation according to the present invention is maintained constant whatever the configuration could be, and in particular whatever the quantity of raw meal in each precalciner could be (see for example flows 132, 133 and 134). So the efficacy of the installation is maintained. Existing installations could thus easily be adapted to the process according to the present invention. The process according to the present invention is flexible enough to be adapted to any existing installation.

The invention claimed is:

1. A process for production of clinker and electricity, comprising:
    introducing a raw meal, fuel and a combustion agent, in at least two precalciners positioned in parallel;
    precalcining the raw meal at a temperature of from 750 to 950° C., in order to obtain precalcination flue gases and a precalcined raw meal;
    treating the precalcination flue gases and the precalcined raw meal towards respective cyclones, in order to obtain precalcination flue gases and a precalcined raw meal;
    clinkerising the precalcined raw meal, in order to obtain clinker;
    producing steam, by transmission of heat from at least one part of the flue gases coming from at least one secondary precalciner and the corresponding cyclone;
    producing electricity from the steam, using an electricity generator comprising a steam turbine and steam generator;
    varying the feed rate of raw meal and/or the flow rate of fuel and/or the flow rate of combustion agent in at least one secondary precalciner, to vary the quantity of electricity produced, and
    introducing into at least one secondary precalciner, a flow of a dilution flue gas, the flow being formed from one part of the precalcination flue gases having already transmitted their heat, wherein the precalcination flue gases coming from the at least one secondary precalciner and the corresponding cyclone are diluted, before transmitting their heat, to obtain diluted precalcination flue gases, with a fraction of the precalcination flue gases having already transmitted their heat.

2. The process according to claim 1, wherein the raw meal is introduced for a first part into a main precalciner, and for another part into at least one secondary precalciner, and wherein only the precalcination flue gases, coming from the, or from each secondary precalciner and corresponding cyclone transmit their heat, after their dilution, to produce steam.

3. The process according to claim 2, wherein the precalcined raw meal is clinkerised in a kiln and the flue gases of the kiln are directed only towards the main precalciner, and only the flue gases of the main precalciner and the corresponding cyclone are directed towards a pre-heater, located between the feeding means of raw meal and the main precalciner.

4. The process according to claim 1, wherein precalcination flue gases coming from the at least one secondary precalciner and the corresponding cyclone are diluted in an additional cyclone, in order to obtain precalcination flue gases and precalcined raw meal.

5. The process according to claim 1, wherein an alternative fuel in introduced into at least one precalciner.

6. The process according to claim 1, wherein the diluted precalcination flue gases transmit their heat at a temperature of 600 to 800° C.

7. The process according to claim 1, further comprising:
    cooling the clinker in a cooler;
    introducing gas in this the cooler;
    directing the cooler's effluent gas, as combustion agents, towards each precalciner, and
    exhausting gas from the cooler.

* * * * *

UNITED STATES PATENT AND TRADEMARK OFFICE
CERTIFICATE OF CORRECTION

Page 1 of 1

PATENT NO. : 9,187,369 B2
APPLICATION NO. : 14/418662
DATED : November 17, 2015
INVENTOR(S) : Michel Gimenez et al.

It is certified that error appears in the above-identified patent and that said Letters Patent is hereby corrected as shown below:

On title page, Item (56) line 6, References Cited:

Correct the following Foreign Patent Document to read:

WO   WO 2009/147465  A1   12/2009

On title page, Item (56) line 7:

Correct the following Other Publication to read:

International Search Report issued in International Patent Application No. PCT/EP2013/065056, dated Dec. 6, 2013

Signed and Sealed this
Fifteenth Day of March, 2016

Michelle K. Lee
*Director of the United States Patent and Trademark Office*